(12) United States Patent
Lai et al.

(10) Patent No.: US 12,339,459 B2
(45) Date of Patent: Jun. 24, 2025

(54) OPTICAL MODULATION STRUCTURE

(71) Applicant: Innolux Corporation, Miaoli County (TW)

(72) Inventors: Jui-Chu Lai, Miaoli County (TW); Huang-Cho Chen, Miaoli County (TW); Shu-Lan Chen, Miaoli County (TW); Po-Ting Yen, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/527,374

(22) Filed: Dec. 4, 2023

(65) Prior Publication Data

US 2024/0231106 A1 Jul. 11, 2024

(30) Foreign Application Priority Data

Jan. 5, 2023 (TW) .................................. 112100431

(51) Int. Cl.
*G02B 27/01* (2006.01)
*G02F 1/00* (2006.01)
*G02F 1/1333* (2006.01)
*G02F 1/35* (2006.01)

(52) U.S. Cl.
CPC ..... *G02B 27/0172* (2013.01); *G02B 27/0189* (2013.01); *G02F 1/0045* (2013.01); *G02F 1/133368* (2021.01); *G02F 1/3515* (2013.01); *G02B 2027/0178* (2013.01)

(58) Field of Classification Search
CPC ............ G02B 27/0172; G02B 27/0189; G02B 2027/0178; G02F 1/133368; G02F 1/0045; G02F 1/3515
See application file for complete search history.

(56) References Cited

U.S. PATENT DOCUMENTS

| 8,149,377 | B2 | 4/2012 | Presniakov et al. |
| 2002/0027679 | A1* | 3/2002 | Popovich ............. G02B 5/3025 359/24 |
| 2004/0004679 | A1* | 1/2004 | McKnight ......... G02F 1/133553 349/43 |
| 2005/0068482 | A1* | 3/2005 | Kume ................... G02F 1/1393 349/156 |
| 2008/0225209 | A1* | 9/2008 | Higa ................. G02F 1/134363 349/96 |
| 2017/0005144 | A1* | 1/2017 | Akagawa ........... H10K 59/8722 |

FOREIGN PATENT DOCUMENTS

WO    WO-2020152963 A1 *  7/2020  ....... G02F 1/133345

* cited by examiner

*Primary Examiner* — Stephen G Sherman
(74) *Attorney, Agent, or Firm* — JCIPRNET (57) ABSTRACT

An electronic device that has an optical modulation region and a non-optical modulation region is provided, and the electronic device includes a first substrate, a first transparent electrode layer, and a second transparent electrode layer. The first transparent electrode layer is disposed on the first substrate. The second transparent electrode layer is disposed on the first transparent electrode layer and has an opening. The optical modulation region overlaps the opening, and the non-optical modulation region overlaps the first transparent electrode layer and the second transparent electrode layer. A cell gap of the optical modulation region is greater than a cell gap of the non-optical modulation region.

18 Claims, 9 Drawing Sheets

OPTICAL MODULATION STRUCTURE

CROSS-REFERENCE TO RELATED APPLICATION

This application claims the priority benefit of Taiwan patent application serial no. 112100431, filed on Jan. 5, 2023. The entirety of each of the above-mentioned patent applications is hereby incorporated by reference herein and made a part of this specification.

BACKGROUND

Technical Field

The disclosure relates to an electronic device.

Description of Related Art

A pair of smart glasses is an electronic device capable of changing a focal length according to actual needs. Specifically, a pair of smart glasses is able to adjust a refractive power of lenses through changing voltages to control a medium layer. A range of the adjustable refractive power is subject to a cell gap. In order to increase the range of the adjustable refractive power, a height of the spacer should be increased to expand the cell gap, while there are still a number of problems to be solved.

SUMMARY

According to an embodiment of the disclosure, an electronic device that has an optical modulation region and a non-optical modulation region is provided, and the electronic device includes a first substrate, a first transparent electrode layer, and a second transparent electrode layer. The first transparent electrode layer is disposed on the first substrate. The second transparent electrode layer is disposed on the first transparent electrode layer and has an opening. The optical modulation region overlaps the opening, and the non-optical modulation region overlaps the first transparent electrode layer and the second transparent electrode layer. A cell gap of the optical modulation region is greater than a cell gap of the non-optical modulation region.

In order for the features and advantages of the disclosure to be more comprehensible, the following specific embodiments are described in detail in conjunction with the drawings.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The disclosure may be understood with reference to the following detailed description with the drawings. Note that for clarity of description and ease of understanding, the drawings of the disclosure show a part of an electronic device, and certain elements in the drawings may not be drawn to scale. In addition, the number and size of each device shown in the drawings simply serve for exemplifying instead of limiting the scope of the disclosure.

Certain terminologies are used throughout the description and the appended claims to refer to specific elements. As to be understood by those skilled in the art, electronic device manufacturers may refer to an element by different names. Herein, it is not intended to distinguish between elements that have different names instead of different functions. In the following description and claims, terminologies such as "include", "comprise", and "have" are used in an open-ended manner, and thus should be interpreted as "including, but not limited to". Therefore, the terminologies "include", "comprise", and/or "have" used in the description of the disclosure denote the presence of corresponding features, regions, steps, operations, and/or elements but are not limited to the presence of one or more corresponding features, regions, steps, operations, and/or elements.

In this disclosure, directional terminologies, such as "top," "bottom," "front," "back," and so on, are used with reference to the orientation of the accompanying drawings. As such, the directional terminologies are used for purposes of illustration and are in no way limiting. In the accompanying drawings, each drawing shows the general features of the methods, structures and/or materials adopted in a specific embodiment. However, the drawings should not be construed as defining or limiting the scope or nature covered by the embodiments. For instance, for clarity, the relative size, thickness, and position of each layer, region, and/or structure may be reduced or enlarged.

When a corresponding element (such as a film layer or a region) is referred to as being "on another element", the element may be directly on the other element or there may be another element between the two. On the other hand, when an element is referred to as being "directly on another element", there is no element between the two. Also, when an element is referred to as being "on another element", the two have a top-down relationship in the top view direction, and the element may be above or below the other element, and the top-down relationship depends on the orientation of the device.

The terminology "equal to," "the same," "substantially," or "roughly" is generally interpreted as being within 20% of a given value or range, or interpreted as being within 10%, 5%, 3%, 2%, 1%, or 0.5% of a given value or range.

The ordinal numbers used in the specification and claims, such as the terminologies "first", "second" and the like, to qualify a component do not imply or represent that the component or components are preceded with any ordinal numbers, nor do they represent the order of a certain component and another component, or the order in the manufacturing method, and are used only so as to clearly distinguish a component with one name from another component with the same name. Different terminologies may be used in the claims and the specification, and accordingly, a first component in the specification may be a second component in the claims.

Note that in the following embodiments, the technical features provided in several different embodiments may be replaced, reorganized, and mixed without departing from the spirit of the disclosure so as to complete other embodiments. The technical features of the embodiments may be mixed and matched arbitrarily as long as they do not violate the spirit of the disclosure or conflict with each other.

The electrical connection or coupling described in this disclosure may refer to direct connection or indirect connection. In the case of direct connection, the endpoints of the components on the two circuits are directly connected or are connected to each other by a conductor segment. In the case of indirect connection, between the end points of the components on the two circuits there are switches, diodes, capacitors, inductances, other suitable components, or a combination of the above-mentioned components, but the disclosure is not limited thereto.

In the disclosure, thickness, length, and width may be measured by an optical microscope, and thickness or width may be measured by a cross-sectional image in an electron microscope, but the disclosure is not limited thereto. In addition, certain errors between any two values or directions for comparison may be acceptable. If a first value is equal to a second value, it indicates that a margin of error of about 10% may exist between the first and second values. If a first direction is perpendicular to a second direction, an angle difference between the first direction and the second direction may be between 80 degrees and 100 degrees; if the first direction is parallel to the second direction, an angle difference between the first direction and the second direction may be between 0 degrees and 10 degrees.

The electronic device disclosed in the disclosure may include but may not be limited to a vision correction device, a display device, an antenna device, a light emitting device, a sensing device, a touch sensing device, or a tiled device, but is not limited thereto. The electronic device may include but may not be limited to a rollable, bendable, or flexible electronic device. The display device may be a non-self-luminous display device or a self-luminous display device. The electronic device may include, for instance, diode, liquid crystal, light emitting diode (LED), quantum dot (QD), fluorescence, phosphor, other suitable display media, or a combination of the foregoing. The antenna device may be a liquid crystal antenna device or a non-liquid crystal antenna device, and the sensing device may be but is not limited to a sensing device for sensing capacitance, light, heat, or ultrasonic waves. The LED may include but may not be limited to, for instance, an organic light emitting diode (OLED), a sub-millimeter light emitting diode (mini LED), a micro light emitting diode (micro LED), or a quantum dot light emitting diode (quantum dot LED). The tiled device may be but is not limited to, for instance, a display tiled device or an antenna tiled device. It should be noted that the electronic device may be any arrangement and combination of the foregoing, but not limited to thereto. In addition, the appearance of the electronic device may be rectangular, circular, polygonal, in a shape with curved edges, or in other suitable shapes. The electronic device may have peripheral systems such as a driving system, a control system, a light source system . . . and the like, so as to support a display device, an antenna device, a wearable device (e.g., including augmented reality or virtual reality), an in-vehicle device (e.g., including car windshield), or a tiled device.

Figure 1:
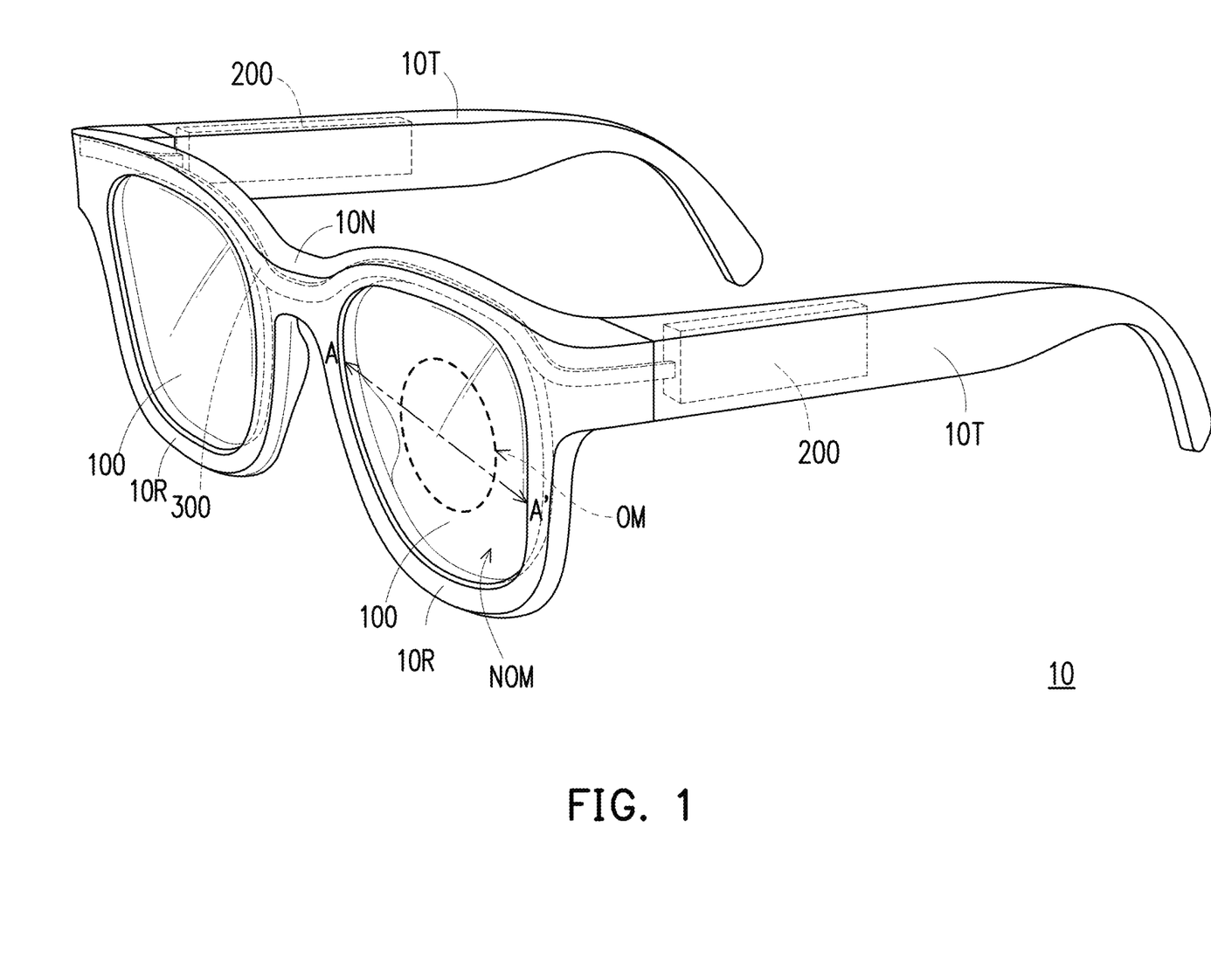
FIG. 1 is a schematic view illustrating an electronic device according to an embodiment of the disclosure.
Figure 2:
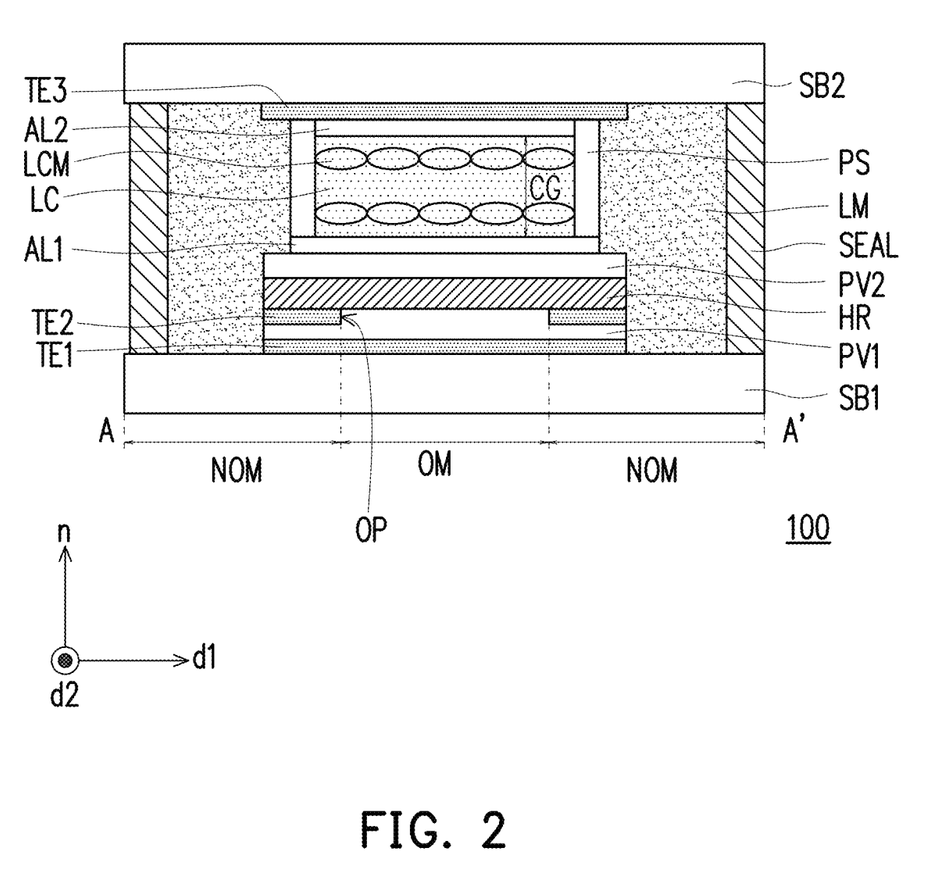
FIG. 2 is a schematic cross-sectional view taken along a sectional line A-A' depicted in FIG. 1.

FIG. 1 is a schematic view illustrating an electronic device according to an embodiment of the disclosure, and FIG. 2 is a schematic cross-sectional view taken along a sectional line A-A' depicted in FIG. 1.

With reference to FIG. 1, an electronic device 10 provided in this embodiment may be, for instance, configured for vision correction. In some embodiments, the electronic device 10 may be configured to correct nearsightedness, farsightedness, presbyopia, astigmatism, or other visual impairment issues. That is, the electronic device 10 is, for instance, a kind of electronic glasses, which should however not be construed as a limitation in the disclosure. For instance, the electronic device 10 has a structure of two frames 10R, two temples 10T, and a bridge 10N, where the corresponding frames 10R are connected to the corresponding temples 10T, and the bridge 10N is connected to the two frames 10R. In addition, in this embodiment, electronic elements in the electronic device 10 include an optical modulation structure 100, a circuit module 200, and a signal transmission element 300. The optical modulation structure 100 is, for instance, disposed on the frames 10R of the electronic device 10 and has, for instance, an electrically tunable focusing function. In detail, the optical modulation structure 100 has, for instance, an optical modulation region OM and a non-optical modulation region NOM, where the non-optical modulation region NOM may for instance, surround the optical modulation region OM, which should however not be construed as a limitation in the disclosure. The non-optical modulation region NOM of the optical modulation structure 100 has a fixed focal length (or a fixed refractive power), and the optical modulation region OM of the optical modulation structure 100 may adjust its focal length (or refractive power) by changing voltages, for instance, which will be elaborated in the following embodiments. The circuit module 200 is disposed in the temples 10T of the electronic device 10 and is electrically connected to the optical modulation structure 100, for instance. In some embodiments, the circuit module 200 may include a power supply unit (not shown), a touch sensor (not shown), a circuit board (not shown), and other corresponding elements to provide power to the optical modulation structure 100 and/or to drive the optical modulation structure 100, which should however not be construed as a limitation in the disclosure. The signal transmission element 300 may be disposed in the frames 10R, the temples 10T, and the bridge 10N of the electronic device 10 and may serve to electrically connect the circuit module 200 to the optical modulation structure 100, for instance.

With reference to FIG. 2, in this embodiment, the optical modulation structure 100 includes a substrate SB1, a transparent electrode layer TE1, and a transparent electrode layer TE2.

The substrate SB1 may be, for instance, a flexible substrate or an inflexible substrate. A material of the substrate SB1 may include glass, plastic, or a combination thereof, for instance. For instance, the material of the substrate SB1 may include quartz, sapphire, polymethyl methacrylate (PMMA), polycarbonate (PC), polyimide (PI), polyethylene terephthalate (PET), any other appropriate material, or a combination of the above-mentioned materials; alternatively, the substrate SB1 may be a chip, which should however not be construed as a limitation in the disclosure. In some embodiments, a thickness of the substrate SB1 is, for instance, 20 μm to 2,000,000 μm.

The transparent electrode layer TE1 is disposed on the substrate SB1, for instance. In some embodiments, the transparent electrode layer TE1 is, for instance, fully disposed on the substrate SB1. In some embodiments, a material of the transparent electrode layer TE1 may include metal oxide, e.g., indium tin oxide (ITO), carbon nanotubes, graphene, any other appropriate material, or a combination of the above-mentioned materials, which should be how construed as a limitation in the disclosure.

The transparent electrode layer TE2 is, for instance, disposed on the transparent electrode layer TE1 and has an opening OP. In this embodiment, the transparent electrode layer TE2 is, for instance, a patterned transparent electrode layer. For instance, the transparent electrode layer TE2 has a ring-shaped structure and has the opening OP, which should however not be construed as a limitation in the disclosure. In some embodiments, a material of the transparent electrode layer TE2 may be identical or similar to the material of the transparent electrode layer TE1 and thus will not be repetitively described hereinafter.

In this embodiment, the optical modulation region OM of the optical modulation structure 100 overlaps the opening OP of the transparent electrode layer TE2 in a normal direction n of the optical modulation structure 100, and the non-optical modulation region NOM of the optical modulation structure 100 at least partially overlaps the transparent electrode layer TE1 and the transparent electrode layer TE2 in the normal direction n of the optical modulation structure 100. That is, the optical modulation region OM and the non-optical modulation region NOM of the optical modulation structure 100 may be defined by the transparent electrode layer TE1 and the transparent electrode layer TE2. In addition, although not shown in FIG. 2, a cell gap of the optical modulation region OM of the optical modulation structure 100 is greater than a cell gap of the non-optical modulation region NOM, which will be described in detail in the following embodiments.

In some embodiments, the optical modulation structure 100 may further include an insulation layer PV1, a high-resistivity film HR, an insulation layer PV2, and an alignment layer AL1 disposed on the substrate SB1.

The insulation layer PV1 is, for instance, disposed between the transparent electrode layer TE1 and the transparent electrode layer TE2. In some embodiments, the insulation layer PV1 is configured to electrically isolate the transparent electrode layer TE1 from the transparent electrode layer TE2. A material of the insulation layer PV1 may include, for instance, an inorganic material (e.g., silicon oxide, silicon nitride, silicon oxynitride, or a stacked layer having at least two of the above-mentioned materials), an organic material (e.g., PI resin, epoxy resin, or acrylic resin), or a combination of the above, which should however not be construed as a limitation in the disclosure.

The high-resistivity film HR is, for instance, disposed on the insulation layer PV1. In this embodiment, the high-resistivity film HR is fully disposed on the transparent electrode layer TE2, which should however not be construed as a limitation in the disclosure.

The high-resistivity film HR has a relatively high surface resistance, which is conducive to mitigating variations of an electric field in a direction (e.g., a first direction d1 or a second direction d2) perpendicular to the normal direction n of the optical modulation structure 100 when the optical modulation structure 100 is driven, so that the optical modulation structure 100 may provide a relatively good image quality. A material of the high-resistivity film HR may for instance, include a conductive polymer, a transparent conductive oxide, metal, carbon nanotubes, graphene, or a combination thereof, which should however not be construed as a limitation in the disclosure.

The insulation layer PV2 is, for instance, disposed on the high-resistivity film HR. A material of the insulation layer PV2 may include, for instance, an inorganic material (e.g., silicon oxide, silicon nitride, silicon oxynitride, or a stacked layer having at least two of the above-mentioned materials), an organic material (e.g., PI resin, epoxy resin, or acrylic resin), or a combination of the above, which should however not be construed as a limitation in the disclosure.

The alignment layer AL1 is disposed on the insulation layer PV2, for instance.

The alignment layer AL1 may for instance, be configured to enable a display medium of the optical modulation structure 100 to be horizontally or vertically aligned and/or may for instance, provide a display medium pre-tilt angle. A material of the alignment layer AL1 may include, for instance, PI, which should however not be construed as a limitation in the disclosure.

In some embodiments, the optical modulation structure 100 may further include a substrate SB2.

The substrate SB2 is disposed opposite to the substrate SB1 in the normal direction n of the optical modulation structure 100, for instance. In some embodiments, a material and a thickness of the substrate SB2 may be identical or similar to the material and the thickness of the substrate SB1 and thus will not be further described hereinafter.

In some embodiments, the optical modulation structure 100 may further include an alignment layer AL2 and a transparent electrode layer TE3 disposed on the substrate SB2.

The transparent electrode layer TE3 is, for instance, disposed on the substrate SB2. In some embodiments, a material of the transparent electrode layer TE3 may be identical or similar to the material of the transparent electrode layer TE1 and thus will not be further described hereinafter.

The alignment layer AL2 is, for instance, disposed on the transparent electrode layer TE3. The alignment layer AL2 may also, for instance, be configured to enable a display medium of the optical modulation structure 100 to be horizontally or vertically aligned and/or may for instance, provide a display medium pre-tilt angle. A material of the alignment layer AL2 may be identical or similar to the material of the alignment layer AL1 and thus will not be further described hereinafter.

In some embodiments, the optical modulation structure 100 may further include a medium layer LC, a support member PS, a sealant SEAL, and an adhesion material LM.

The medium layer LC is, for instance, disposed between the substrate SB1 and the substrate SB2. In some embodiments, the medium layer LC includes, for instance, liquid crystal molecules LCM, and the liquid crystal molecules LCM may be arranged through changing voltages, for instance. For instance, when the optical modulation structure 100 is not driven, the liquid crystal molecules LCM are arranged according to an alignment direction (e.g., the first direction d1) of the alignment layer AL1 and the alignment layer AL2. By contrast, when the optical modulation structure 100 is driven, the liquid crystal molecules LCM may, according to a voltage between two electrodes, have a corresponding tilt direction. In some embodiments, the medium layer LC may include electrically controlled birefringence (ECB) liquid crystal molecules, vertical alignment (VA) liquid crystal molecules, or other appropriate liquid crystal molecules, which should however not be construed as a limitation in the disclosure. The medium layer LC may be formed between the substrate SB1 and the substrate SB2 through one drop fill (ODF), for instance, which should however not be construed as a limitation in the disclosure.

The support member PS is, for instance, disposed between the substrate SB1 and the substrate SB2 and configured to support the substrate SB1 and the substrate SB2, for instance. In some embodiments, the support member PS may serve to define a cell gap CG of the optical modulation structure 100. A material of the support member PS is not particularly limited and may include, for instance, an organic photosensitive material. In addition, the shape of the support member PS is not particularly limited and may be columnar, for instance. In this embodiment, the cell gap CG of the optical modulation structure 100 is the maximum distance between the alignment layer AL1 and the alignment layer AL2 in the normal direction n of the optical modulation structure 100, which should however not be construed as a limitation in the disclosure. In addition, in some embodiments, the alignment layer AL1 and/or the alignment layer AL2 may remain on a bottom surface and/or a side surface of the support member PS, which should however not be construed as a limitation in the disclosure.

The sealant SEAL is, for instance, disposed between the substrate SB1 and the substrate SB2 and may surround the medium layer LC, for instance. In some embodiments, the sealant SEAL may be configured to bond the substrate SB1 and the substrate SB2, and the sealant SEAL may together with the substrate SB1 or the substrate SB2, define a space for accommodating the medium layer LC.

The adhesion material LM is, for instance, disposed between the substrate SB1 and the substrate SB2 and located between the sealant SEAL and the medium layer LC. In some embodiments, the adhesion material LM may also be configured to bond the substrate SB1 and the substrate SB2, so that the substrate SB1 and the substrate SB2 may be bonded more evenly. The adhesion material LM may include, for instance, a liquid optically clear adhesive (LOCA), which should however not be construed as a limitation in the disclosure. In other embodiments, the adhesion material LM may include an optical clear adhesive (OCA) or optical clear resin (OCR).

In this embodiment, the optical modulation region OM and the non-optical modulation region NOM of the optical modulation structure 100 may be defined by the transparent electrode layer TE1 and the transparent electrode layer TE2, and how to adjust the focal length (or the refractive power) in the optical modulation region OM of the optical modulation structure 100 by means of voltages is described hereinafter.

In detail, when the optical modulation structure 100 is driven, a first voltage is applied to the transparent electrode layer TE1, and a second voltage is applied to the transparent electrode layer TE2, where the first voltage is different from the second voltage, the first voltage is the absolute value of a voltage difference between the transparent electrode layer TE1 and the transparent electrode layer TE3, and the second voltage is the absolute value of a voltage difference between the transparent electrode layer TE2 and the transparent electrode layer TE3. In some embodiments, when the first voltage is greater than the second voltage, the absolute value of the first voltage is less than or equal to 50 V, the absolute value of the second voltage is less than the absolute value of one half the first voltage, and vice versa.

In this embodiment, before the first voltage is applied to the transparent electrode layer TE1 and before the second voltage is applied to the transparent electrode layer TE2, a third voltage may be applied to the transparent electrode layer TE1 and the transparent electrode layer TE2, where the third voltage is greater than the first voltage and the second voltage. In some embodiments, the third voltage is less than 1.5 times the maximum absolute value of the first voltage and the second voltage, which should however not be construed as a limitation in the disclosure. Through applying a relatively large third voltage to the transparent electrode layer TE1 and the transparent electrode layer TE2, the tilt speed of the liquid crystal molecules LCM (which is changed in response to the voltages) in the medium layer LC may be increased, so as to increase the electrically tunable focusing speed of the optical modulation structure 100.

Accordingly, by setting the different first and second voltages, for instance, the liquid crystal molecules LCM may have a tilt angle in the optical modulation region OM, thereby changing the refractive index of the liquid crystal molecules LCM in the optical modulation region OM and further adjusting the focal length (or the refractive power) in the optical modulation region OM of the optical modulation structure 100.

For instance, when the first voltage applied to the transparent electrode layer TE1 is greater than the second voltage applied to the transparent electrode layer TE2, an electric field strength of the optical modulation structure 100 may be changed from high to low in a direction from the center of the optical modulation region OM to the non-optical modulation region NOM (e.g., the first direction d1), so that the optical modulation structure 100 may have a negative refractive power and may serve as a concave lens. By contrast, when the first voltage applied to the transparent electrode layer TE1 is less than the second voltage applied to the transparent electrode layer TE2, the electric field strength of the optical modulation structure 100 may be changed from low to high in the direction from the center of the optical modulation region OM to the non-optical modulation region NOM (e.g., the first direction d1), so that the optical modulation structure 100 may have a positive refractive power and may serve as a convex lens.

It is worth noting that the arrangement of the high-resistivity film HR in this embodiment alleviates the variation of the above-mentioned electric field strength at the boundary between the optical modulation region OM and the non-optical modulation region NOM, so as to reduce the impact caused by the drastic change of the electric field on the display quality of images of the electronic device 10.

In view of the above, by adjusting the applied first voltage and/or second voltage, different electric fields may be generated in the optical modulation region OM of the optical modulation structure 100, whereby the optical modulation region OM of the optical modulation structure 100 may have the adjustable focal length (or reactive power). In addition, the focal length (or the refractive power) of the optical modulation region OM may be switched among the far side, the middle side, and the near side, for instance, so that the electronic device 10 including the optical modulation structure 100 may provide a continuous and tunable focusing function.

Figure 3:
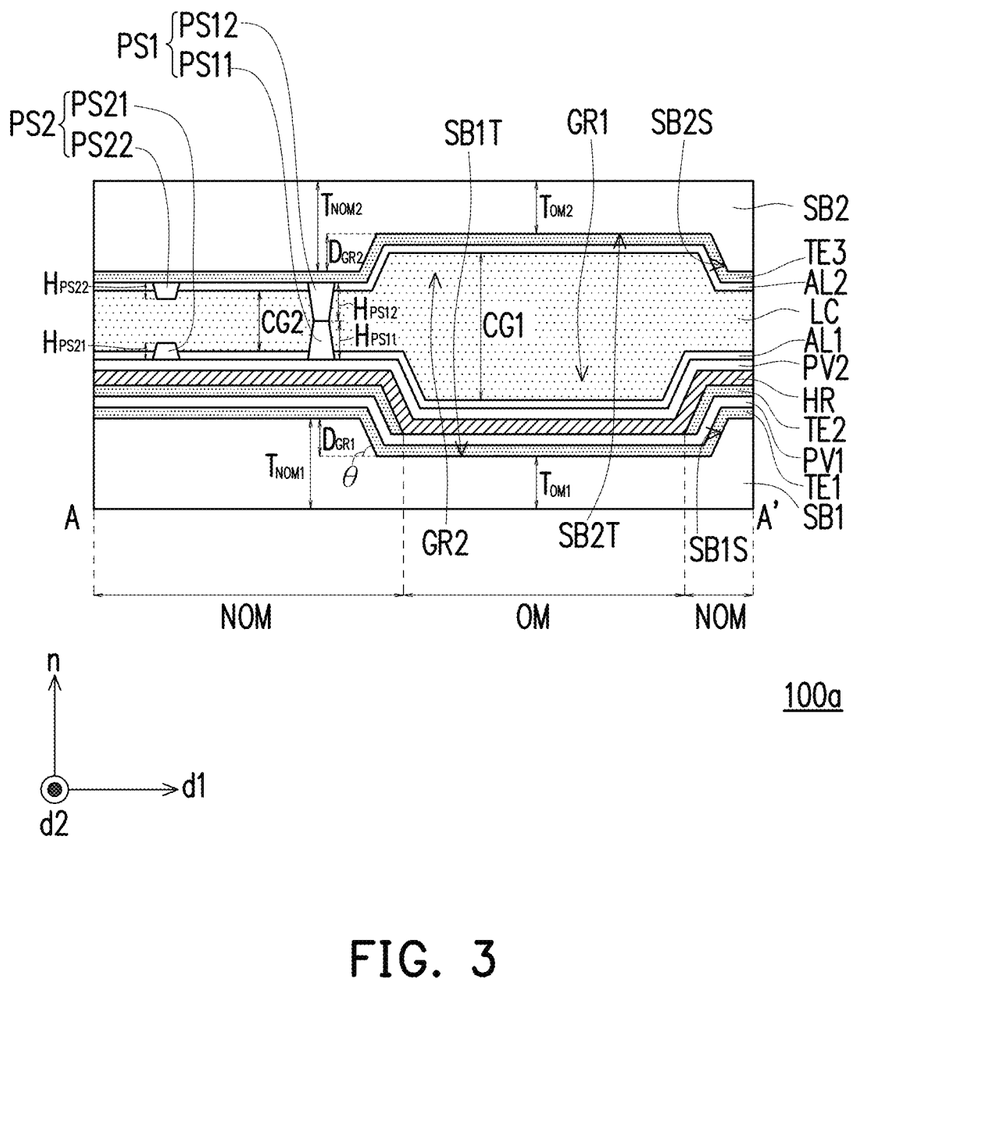
FIG. 3 is a schematic cross-sectional view illustrating a portion of an electronic device according to a first embodiment of the disclosure.

FIG. 3 is a schematic cross-sectional view illustrating a portion of an electronic device according to a first embodiment of the disclosure. Note that the reference numbers and part of the content provided in the embodiment in FIG. 3 may be derived from those provided in the embodiment in FIG. 2, the same or similar reference numbers serve to represent the same or similar elements, and the description of the same technical content is omitted.

In this embodiment, a schematic partially enlarged view of an optical modulation structure 100a is shown, where the optical modulation structure 100a includes the components provided in the above embodiments and thus will not be further described hereinafter.

In the optical modulation structure 100a provided in this embodiment, a cell gap CG1 of the optical modulation region OM is greater than a cell gap CG2 of the non-optical modulation region NOM. Particularly, the cell gap CG1 of the optical modulation region OM is the cell gap in the optical modulation region OM, and the cell gap CG2 of the non-optical modulation region NOM is the cell gap in the non-optical modulation region NOM, where the cell gap of the optical modulation region OM may be further expanded by performing an etching process, a polishing process, a laser process, or a combination of these processes on the substrate SB1 and the substrate SB2. For instance, before components are formed on the substrate SB1 and the substrate SB2, the etching process may be performed to form a groove GR1 and a groove GR2 in the substrate SB1 and the substrate SB2 respectively; here, the etching process may be, for instance, a wet etching process, and an etchant used in the etching process may for instance, include hydrofluoric acid, which should however not be construed as a limitation in the disclosure. In this embodiment, although the etching process is performed on both the substrate SB1 and the substrate SB2, note that this should however not be construed as a limitation in the disclosure. In other embodiments, the etching process may be performed on one of the substrate SB1 and the substrate SB2 to form a groove and increase the cell gap in the optical modulation region OM. In other embodiments, the cell gap provided in this disclosure may also be adjusted by changing a thickness of the insulation layer on one of the substrate SB1 and the substrate SB2. Specifically, the substrate SB1 and the substrate SB2 have the same thickness in the optical modulation region OM and the non-optical modulation region NOM, while the thickness of the insulation layer disposed on the substrate SB1 (or the substrate SB2) in the optical modulation region OM may be less than the thickness of the insulation layer in the non-optical modulation region NOM, so that the cell gap CG1 of the optical modulation region OM is greater than the cell gap CG2 of the optical modulation region NOM, which should however not be construed as a limitation in the disclosure.

Since the substrate SB1 in the optical modulation structure 100a has the groove GR1 in the optical modulation region OM, the thickness of the substrate SB1 in the optical modulation region OM is less than the thickness of the substrate SB1 in the non-optical modulation region NOM. In detail, the substrate SB1 has a thickness $T_{OM1}$ in the optical modulation region OM, the substrate SB1 has a thickness $T_{NOM1}$ in the non-optical modulation region NOM, and the thickness $T_{OM1}$ of the substrate SB1 in the optical modulation region OM is less than the thickness $T_{NOM1}$ of the substrate SB1 in the non-optical modulation region NOM. In other embodiments, a thickness $T_{OM2}$ of the substrate SB2 in the optical modulation region OM is also less than a thickness $T_{NOM2}$ of the substrate SB2 in the non-optical modulation region NOM, which will not be further described hereinafter.

From another perspective, the groove GR1 in the substrate SB1 has a depth $D_{GR1}$, and the sum of the thickness $T_{OM1}$ of the substrate SB1 in the optical modulation region OM and the depth $D_{GR1}$ of the groove GR1 in the substrate SB1 may be, for instance, equal to the thickness $T_{NOM1}$ of the substrate SB1 in the non-optical modulation region NOM. In some embodiments, the depth $D_{GR1}$ of the groove GR1 in the substrate SB1 is less than or equal to 75% of the thickness $T_{NOM1}$ of the substrate SB1 in the non-optical modulation region NOM ($0<D_{GR1}/T_{NOM1}\leq 75\%$), which should however not be construed as a limitation in the disclosure. Similarly, the sum of the thickness $T_{NOM2}$ of the substrate SB2 in the optical modulation region OM and a depth $D_{NOM2}$ of the groove GR2 in the substrate SB2 may be, for instance, equal to the thickness $T_{NOM2}$ of the substrate SB2 in the non-optical modulation region NOM. In some embodiments, the depth $D_{GR2}$ of the groove GR2 in the substrate SB2 is less than or equal to 75% of the thickness $T_{NOM2}$ of the substrate SB2 in the non-optical modulation region NOM ($0<D_{GR2}/T_{NOM2}\leq 75\%$), which should however not be construed as a limitation in the disclosure. The depth $D_{GR1}$ of the groove GR1 in the substrate SB1 may be the same as or different from the depth $D_{GR2}$ of the groove GR2 in the substrate SB2, for instance. In this embodiment, the depth $D_{GR1}$ of the groove GR1 in the substrate SB1 may be equal to the depth $D_{GR2}$ of the groove GR2 in the substrate SB2, which should however not be construed as a limitation in the disclosure.

In this embodiment, the support member PS in the optical modulation structure 100a includes a first support member PS1 (e.g., a main support member) and a second support member PS2 (e.g., an auxiliary support member), where the first support member PS1 and the second support member PS2 are disposed in the non-optical modulation region NOM. The first support member PS1 may be, for instance, closer to the optical modulation region OM than the second support member PS2 is, which should however not be construed as a limitation in the disclosure. In addition, although not shown in the drawings, the first support member PS1 and/or the second support member PS2 may be further disposed in the optical modulation region OM on the premise of not affecting the adjustment of the focal length in the optical modulation region OM.

In this embodiment, the first support member PS1 may include a first auxiliary support member PS11 disposed on the substrate SB1 and a first auxiliary support member PS12 disposed on the substrate SB2, and the second support member PS2 includes a second auxiliary support member PS21 disposed on the substrate SB1 and a second auxiliary support member PS22 disposed on the substrate SB2, where the first auxiliary support member PS11 and the second auxiliary support member PS21 may be respectively disposed corresponding to the first auxiliary support member PS12 and the second auxiliary support member PS22 in the normal direction n of the optical modulation structure 100a. In some embodiments, a top surface of the corresponding first auxiliary support member PS11 disposed on the substrate SB1 may abut against a bottom surface of the corresponding first auxiliary support member PS12 disposed on the substrate SB2, and there may be a cell gap between a top surface of the corresponding second auxiliary support member PS21 disposed on the substrate SB1 and a bottom surface of the corresponding second auxiliary support member PS22 disposed on the substrate SB2.

In some embodiments, a height of the first support member PS1 is greater than a height of the second support member PS2. For instance, a height $H_{PS11}$ of the exemplary first auxiliary support member PS11 disposed on the substrate SB1 is greater than a height $H_{PS21}$ of the exemplary second auxiliary support member PS21 disposed on the substrate SB1. In addition, a height H of the first auxiliary support member PS12 on the substrate SB2 is also greater than a height $H_{PS12}$ of the second auxiliary support member PS22.

In this embodiment, the substrate SB1 has a sidewall SB1S in the non-optical modulation region NOM. Specifically, the substrate SB1 has the sidewall SB1S and a top surface SB1T that defines the space of the groove GR1 after the etching process is performed on the substrate SB1. In some embodiments, the transparent electrode layer TE2 disposed on the substrate SB1 may at least cover the sidewall SB1S of the substrate SB1 to define the optical modulation region OM of the substrate SB1, where at least one portion of the top surface SB1T of the substrate SB1 is located in the optical modulation region OM of the optical modulation structure 100a. The sidewall SB1S of the substrate SB1 may be, for instance, tilted with respect to the normal direction n of the optical modulation structure 100a, and the top surface SB1T of the substrate SB1 may be, for instance, perpendicular to the normal direction n of the optical modulation structure 100a, which should however not be constructed as a limitation in the disclosure. In this embodiment, an included angle θ between the sidewall SB1S of the substrate SB1 and the top surface SB1T of the substrate SB1 in the optical modulation region OM is greater than or equal to 30 degrees and less than 90 degrees, which should however not be constructed as a limitation in the disclosure. Similarly, the groove GR2 of the substrate SB2 may be defined by the sidewall SB12 and the top surface SB2T, which will not be further described hereinafter.

In view of the above, through performing the etching process on the substrate SB1 and the substrate SB2 according to the present embodiment, the cell gap in the optical modulation region OM of the optical modulation structure 100a may be expanded, so as to improve the range of the adjustable refractive power of the optical modulation structure 100a. That is, by changing the thickness of the substrate SB1 and the thickness of the substrate SB2 in the optical modulation region OM, manufacturing difficulties of the optical modulation structure 100a may be reduced, and the possibility of bending the substrate SB1 and/or the substrate SB2 of the optical modulation structure 100a may be lessened, whereby the issue of an abnormal cell gap which results from uneven distribution of the medium layer LC may be mitigated.

Besides, in the present embodiment, the groove GR1 and the groove GR2 are formed in the substrate SB1 and the substrate SB2 of the optical modulation structure 100a, and when the medium layer LC is disposed between the substrate SB1 and the substrate SB2, the groove GR1 and the groove GR2 may generate a relatively large space for accommodating the medium layer LC. Accordingly, a diffusion rate of the medium layer LC may be slowed down, thereby mitigating an overflow issue of the medium layer LC in the optical modulation structure 100a.

Figure 4:
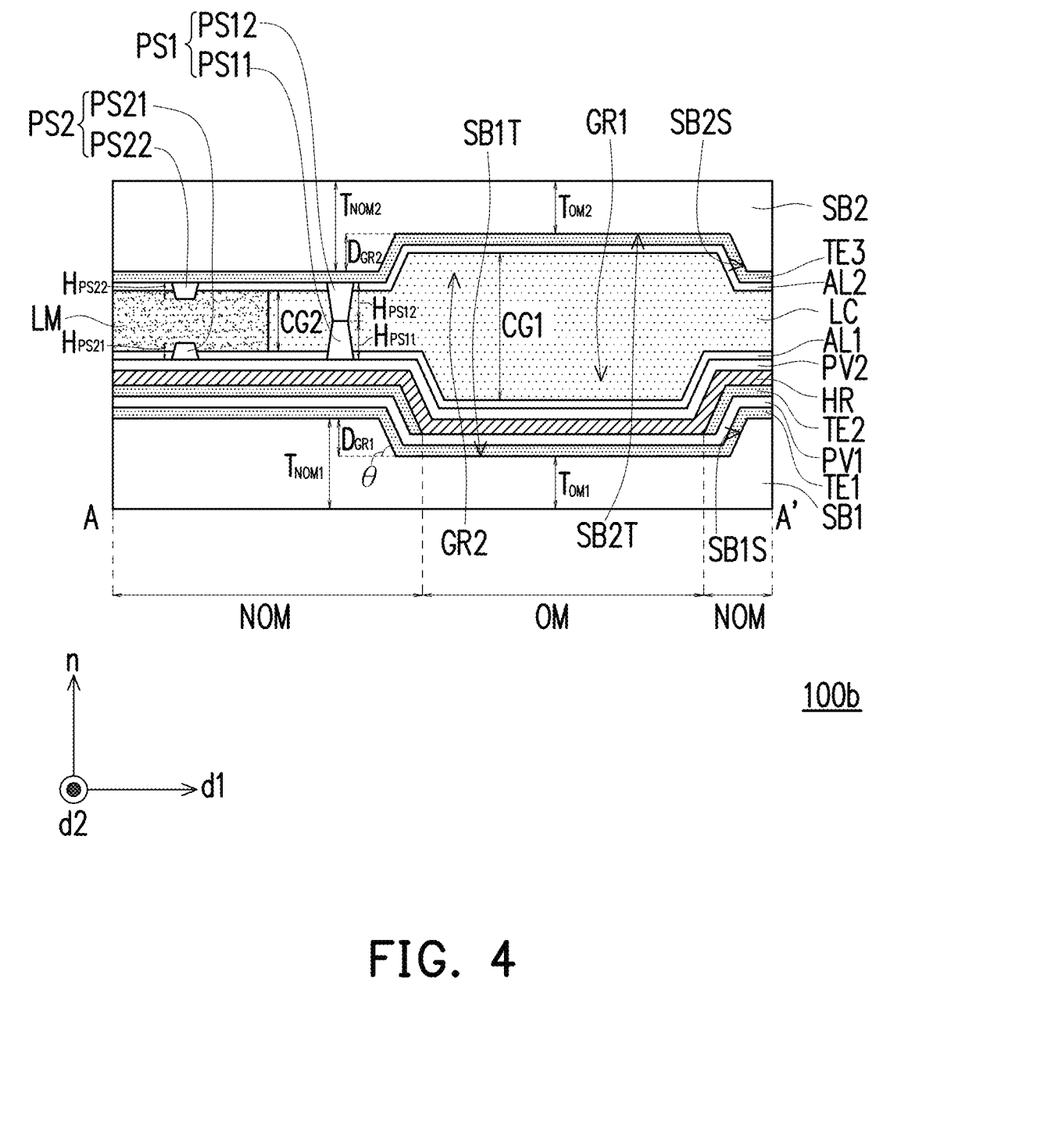
FIG. 4 is a schematic cross-sectional view illustrating a portion of an electronic device according to a second embodiment of the disclosure.

FIG. 4 is a schematic cross-sectional view illustrating a portion of an electronic device according to a second embodiment of the disclosure. Note that the reference numbers and part of the content provided in the embodiment in FIG. 4 may be derived from those provided in the embodiment in FIG. 3, the same or similar reference numbers serve to represent the same or similar elements, and the description of the same technical content is omitted.

In this embodiment, a schematic partially enlarged view of an optical modulation structure 100b is shown, where the optical modulation structure 100b includes the components provided in the above embodiments and thus will not be further described hereinafter.

One of the differences between the optical modulation structure 100b in FIG. 4 and the optical modulation structure 100a lies in that: the adhesion material LM in the optical modulation structure 100b is at least partially disposed between the first support member PS1 and the second support member PS2.

For instance, as shown in FIG. 4, the adhesion material LM may be disposed between the first support member PS1 and the second support member PS2 in the first direction, which should however not be constructed as a limitation in the disclosure. In some embodiments, the adhesion material LM may further overlap the second support member PS2; that is, the adhesion material LM may surround the second support member PS2, and a portion of the adhesion material LM may be located between and overlap the second auxiliary support member PS21 and the second auxiliary support member PS22 in the normal direction n of the optical modulation structure 100b, which should however not be construed as a limitation in the disclosure.

Figure 5:
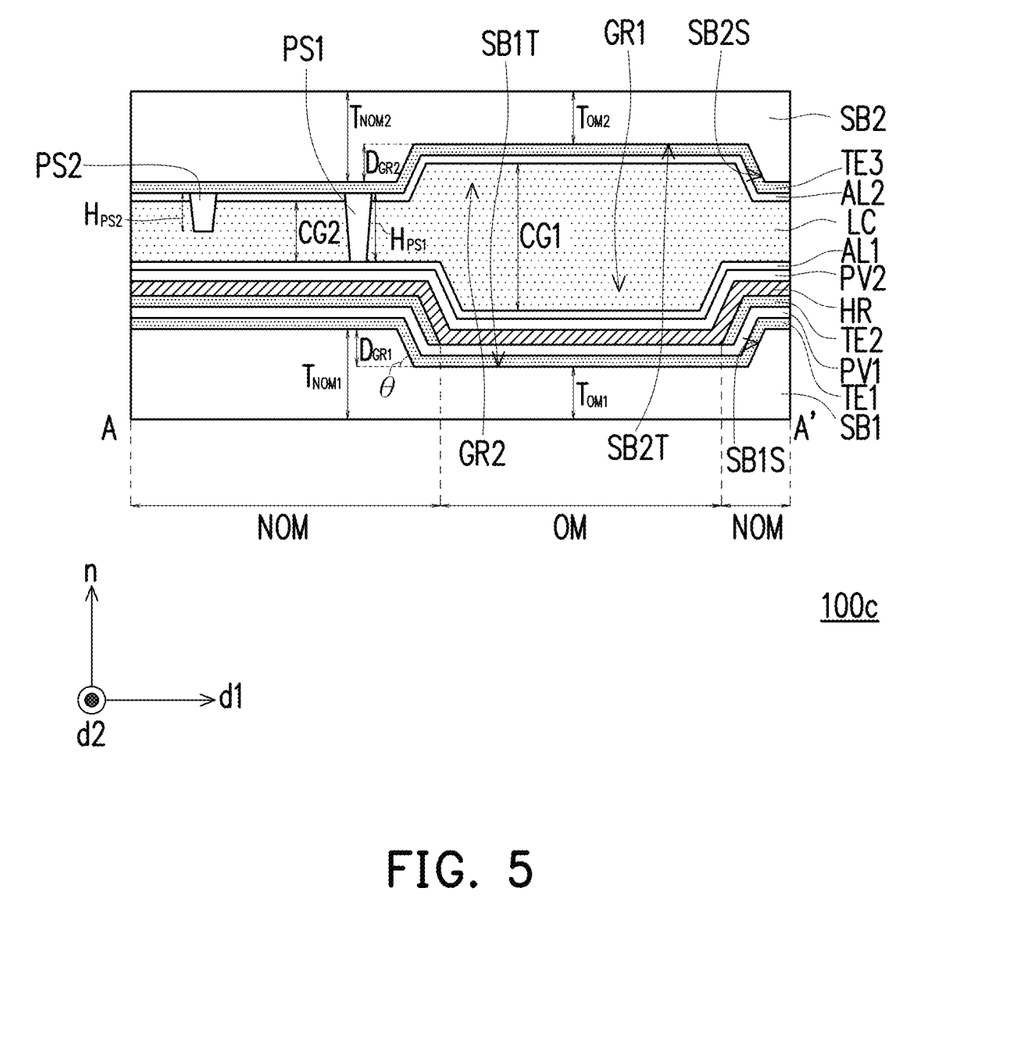
FIG. 5 is a schematic cross-sectional view illustrating a portion of an electronic device according to a third embodiment of the disclosure.

FIG. 5 is a schematic cross-sectional view illustrating a portion of an electronic device according to a third embodiment of the disclosure. Note that the reference numbers and part of the content provided in the embodiment in FIG. 5 may be derived from those provided in the embodiment in FIG. 3, the same or similar reference numbers serve to represent the same or similar elements, and the description of the same technical content is omitted.

In this embodiment, a schematic partially enlarged view of an optical modulation structure 100c is shown, where the optical modulation structure 100c includes the components provided in the above embodiments and thus will not be further described hereinafter.

One of the differences between the optical modulation structure 100c in FIG. 5 and the optical modulation structure 100a lies in that: the first support member PS1 and the second support member PS2 in the optical modulation structure 100c are disposed on the substrate SB2.

In this embodiment, the top surface of the first support member PS1 disposed on the substrate SB2 may for instance, abut against the alignment layer AL1 disposed on the substrate SB1, and there may be a cell gap between the top surface of the second support member PS2 disposed on the substrate SB2 and the alignment layer AL1 disposed on the substrate SB1, for instance. In other words, the height H of the first support member PS1 is greater than the height $H_{PS2}$ of the second support member PS2, for instance.

Figure 6:
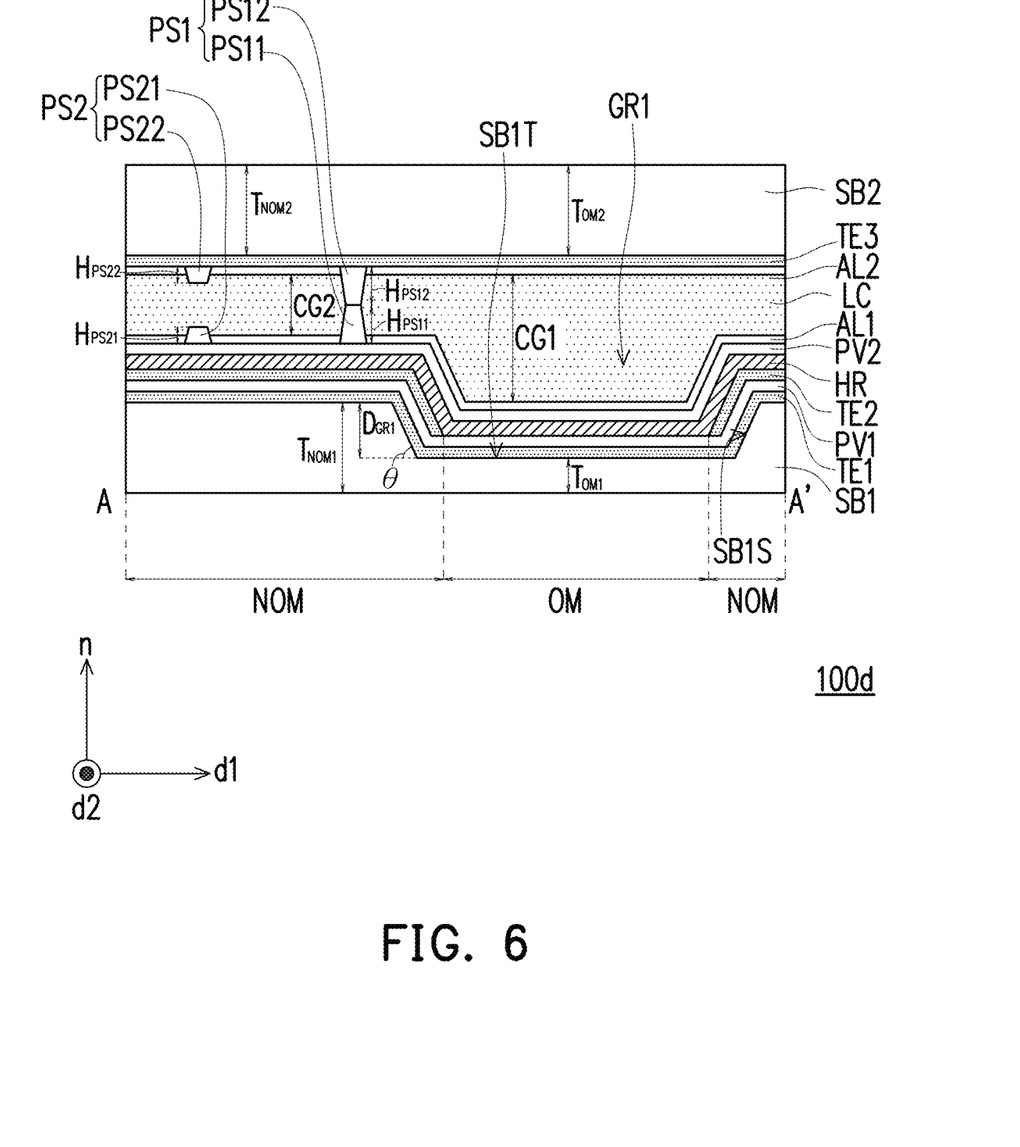
FIG. 6 is a schematic cross-sectional view illustrating a portion of an electronic device according to a fourth embodiment of the disclosure.

FIG. 6 is a schematic cross-sectional view illustrating a portion of an electronic device according to a fourth embodiment of the disclosure. Note that the reference numbers and part of the content provided in the embodiment in FIG. 6 may be derived from those provided in the embodiment in FIG. 5, the same or similar reference numbers serve to represent the same or similar elements, and the description of the same technical content is omitted.

In this embodiment, a schematic partially enlarged view of an optical modulation structure 100d is shown, where the optical modulation structure 100d includes the components provided in the above embodiments and thus will not be further described hereinafter.

One of the differences between the optical modulation structure 100d in FIG. 6 and the optical modulation structure 100c lies in that: the substrate SB2 in the optical modulation structure 100d does not have the groove GR2, where the cell gap of the optical modulation region OM is defined by performing the etching process, the polishing process, the laser process, or a combination thereof on the substrate SB1 to form the groove GR1.

In this embodiment, the cell gap CG1 of the optical modulation region OM may be further expanded by forming the groove GR1 through performing the etching process on the substrate SB1.

In addition, since no etching process, polishing process, laser process, or a combination thereof is performed on the substrate SB2, the thickness $T_{OM2}$ of the substrate SB2 in the optical modulation region OM is equal to the thickness $T_{OM2}$ of the substrate SB2 in the non-optical modulation region NOM. By contrast, the depth $D_{GR1}$ of the groove GR1 of the substrate SB1 may be relatively large. Thereby, the overflow issue of the medium layer LC in the optical modulation structure 100d may be further mitigated.

Figure 7:
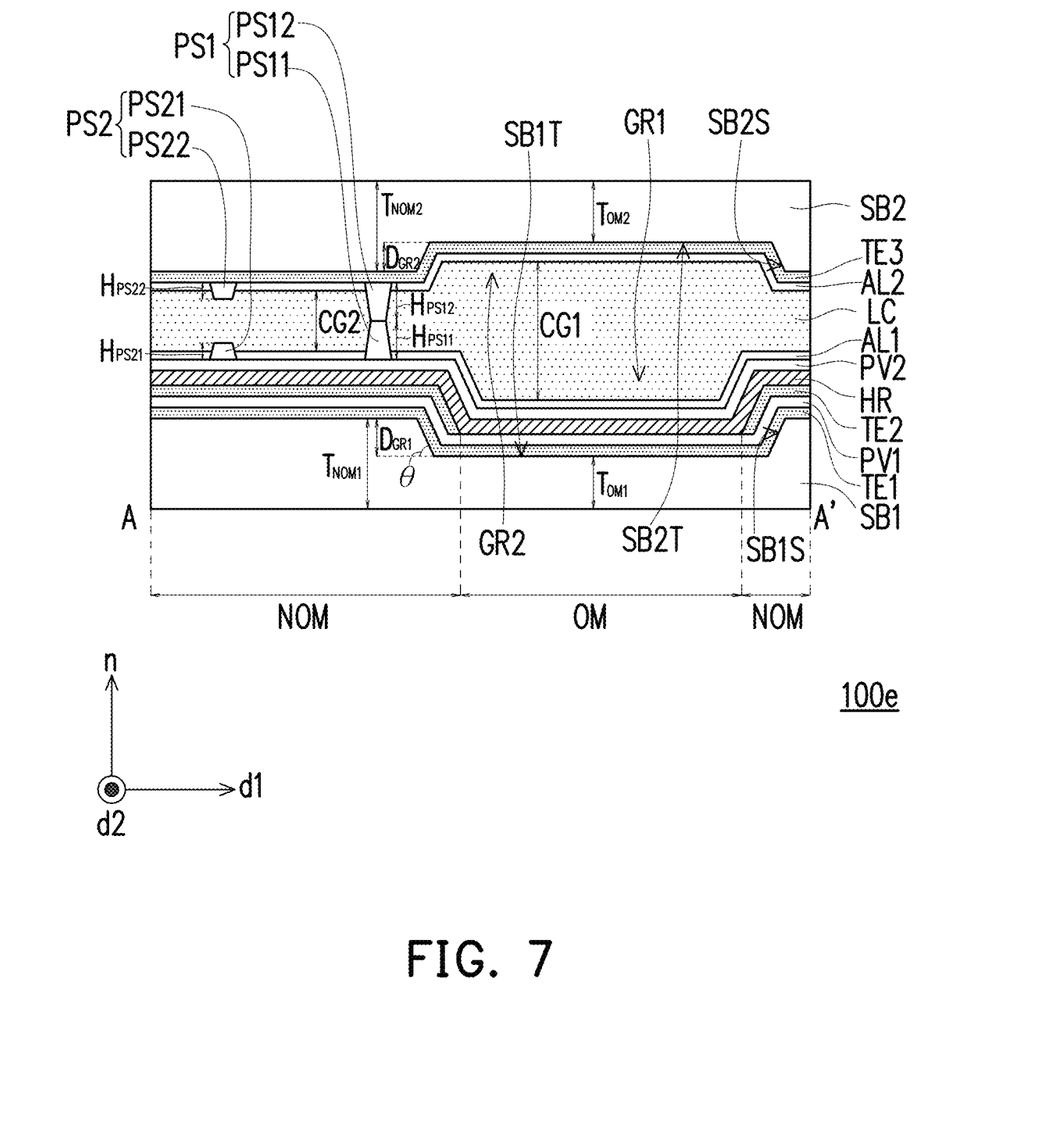
FIG. 7 is a schematic cross-sectional view illustrating a portion of an electronic device according to a fifth embodiment of the disclosure.

FIG. 7 is a schematic cross-sectional view illustrating a portion of an electronic device according to a fifth embodiment of the disclosure. Note that the reference numbers and part of the content provided in the embodiment in FIG. 7 may be derived from those provided in the embodiment in FIG. 3, the same or similar reference numbers serve to represent the same or similar elements, and the description of the same technical content is omitted.

In this embodiment, a schematic partially enlarged view of an optical modulation structure 100e is shown, where the optical modulation structure 100e includes the components provided in the above embodiments and thus will not be further described hereinafter.

One of the differences between the optical modulation structure 100e in FIG. 7 and the optical modulation structure 100a lies in that: the groove GR1 of the substrate SB1 and the groove GR2 of the substrate SB2 in the optical modulation structure 100e have different depths.

In this embodiment, the depth $D_{GR1}$ of the groove GR1 of the substrate SB1 is greater than the depth $D_{GR2}$ of the groove GR2 of the substrate SB2. From another perspective, the thickness $T_{OM1}$ of the substrate SB1 in the optical modulation region OM is less than the thickness $T_{OM2}$ of the substrate SB2 in the optical modulation region OM. In view of the above, the overflow issue of the medium layer LC in the optical modulation structure 100e may be further mitigated.

Figure 8:
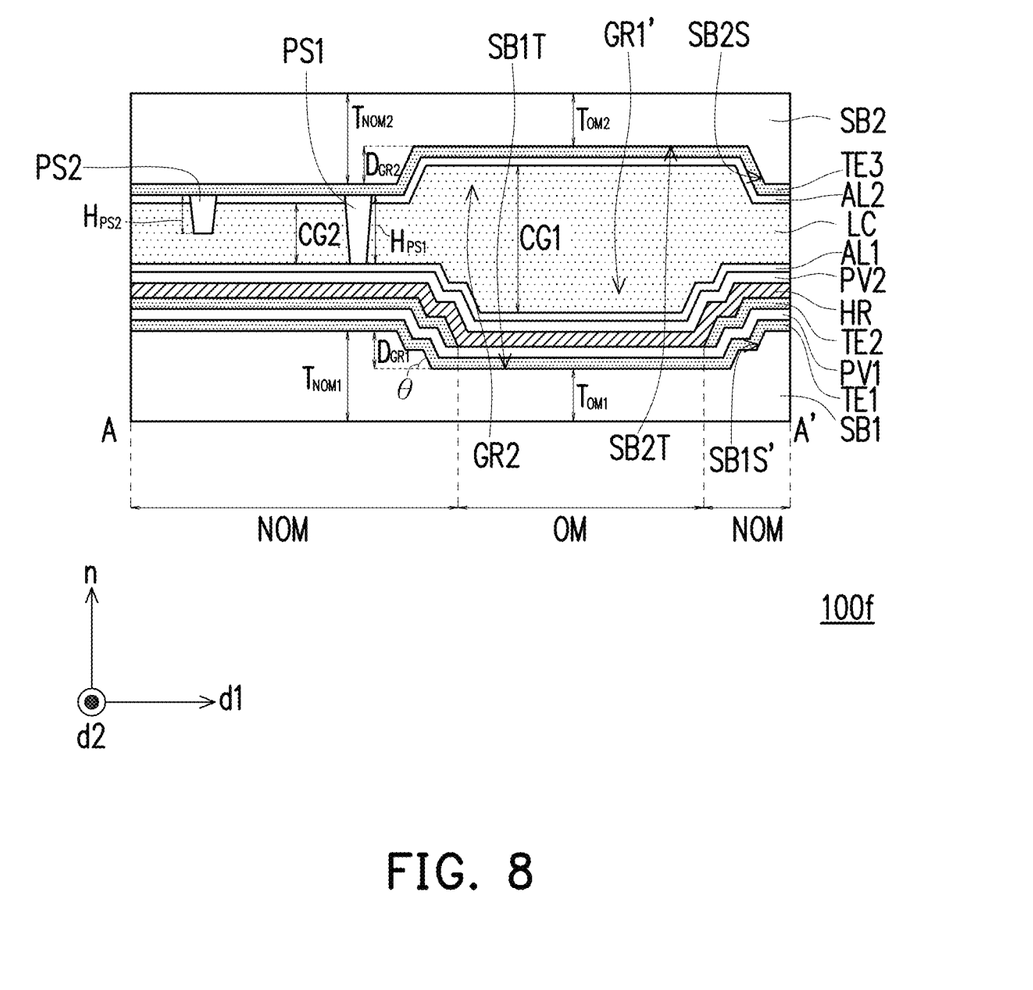
FIG. 8 is a schematic cross-sectional view illustrating a portion of an electronic device according to a sixth embodiment of the disclosure.

FIG. 8 is a schematic cross-sectional view illustrating a portion of an electronic device according to a sixth embodiment of the disclosure. Note that the reference numbers and part of the content provided in the embodiment in FIG. 8 may be derived from those provided in the embodiment in FIG. 6, the same or similar reference numbers serve to represent the same or similar elements, and the description of the same technical content is omitted.

In this embodiment, a schematic partially enlarged view of an optical modulation structure 100f is shown, where the optical modulation structure 100f includes the components provided in the above embodiments and thus will not be further described hereinafter.

One of the differences between the optical modulation structure 100f in FIG. 8 and the optical modulation structure 100d lies in that: the substrate SB1 in the optical modulation structure 100f has a step-shaped sidewall SB1S' in the non-optical modulation region NOM.

In this embodiment, multiple etching processes, polishing processes, laser processes, or a combination thereof may be performed to form a groove GR1' defined by the sidewall SB1S' and the top surface SB1T of the substrate SB1 on the substrate SB1, where the sidewall SB1S' of the substrate SB1 is step-shaped after multiple etching processes, polishing processes, laser processes, or a combination thereof is performed on the sidewall SB1S'.

In the other embodiments, if the substrate SB2 has the groove GR2, note that the substrate SB2 may also have a step-shaped sidewall. Namely, each of the substrate SB1 and the substrate SB2 may have the step-shaped sidewall at the same time, or one of the substrate SB1 and the substrate SB2 has the step-shaped sidewall, which should however not be construed as a limitation in the disclosure.

Figure 9:
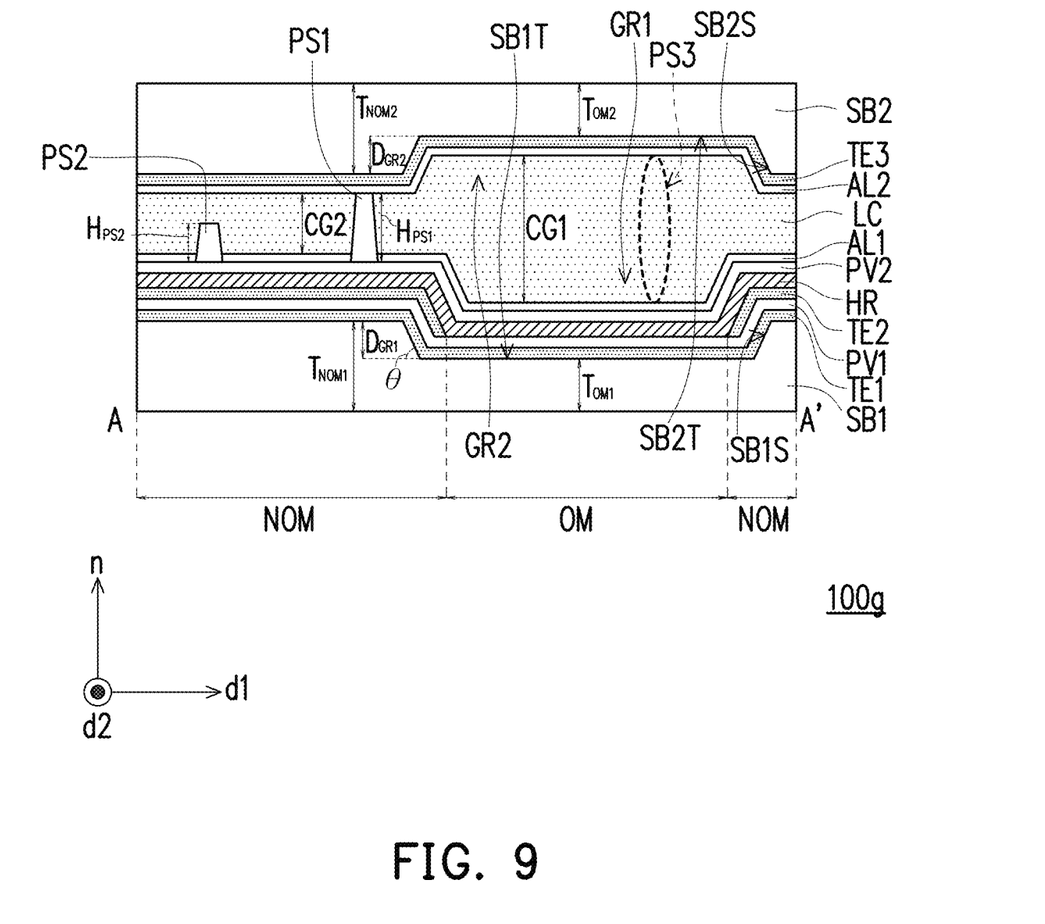
FIG. 9 is a schematic cross-sectional view illustrating a portion of an electronic device according to a seventh embodiment of the disclosure.

FIG. 9 is a schematic cross-sectional view illustrating a portion of an electronic device according to a seventh embodiment of the disclosure. Note that the reference numbers and part of the content provided in the embodiment in FIG. 9 may be derived from those provided in the embodiment in FIG. 3, the same or similar reference numbers serve to represent the same or similar elements, and the description of the same technical content is omitted.

In this embodiment, a schematic partially enlarged view of an optical modulation structure 100g is shown, where the optical modulation structure 100g includes the components provided in the above embodiments and thus will not be further described hereinafter.

One of the differences between the optical modulation structure 100g in FIG. 9 and the optical modulation structure 100a lies in that: the first support member PS1 and the second support member PS2 in the optical modulation structure 100g are disposed on the substrate SB1, and the optical modulation structure 100g further includes a third support member PS3.

In this embodiment, the top surface of the first support member PS1 disposed on the substrate SB1 may for instance, abut against the alignment layer AL2 disposed on the substrate SB2, and there may be a cell gap between the top surface of the second support member PS2 disposed on the substrate SB1 and the alignment layer AL2 disposed on the substrate SB2, for instance.

In addition, in this embodiment, the third support member PS3 of the optical modulation structure 100g is disposed in the optical modulation region OM, and two opposite surfaces of the third support member PS3 may for instance, abut against the alignment layer AL1 disposed on the substrate SB1 and abut against the alignment layer AL2 disposed on the substrate SB2. Hence, a height $H_{PS3}$ of the third support member PS3 is greater than the height $H_{PS1}$ of the first support member PS1, for instance. The shape of the third support member PS3 may be spherical, columnar, or any other appropriate shape, for instance. Although the shape of the third support member PS3 shown in FIG. 9 is spherical, this should however not be construed as a limitation in the disclosure.

In addition, although not shown in FIG. 9, the optical modulation structure 100g may further include other support members disposed in the optical modulation region OM, these support members may be disposed on the substrate SB1 or the substrate SB2, and there may be a cell gap between these support members and the alignment layer AL2 or the alignment layer AL1. Moreover, the third support member PS3 may be disposed on the substrate SB1 and the substrate SB2, respectively, and the two third support member PS3 correspondingly disposed on the substrate SB1 and the substrate SB2 may abut against each other.

To sum up, the optical modulation structure of the electronic device provided in one or more embodiments of the disclosure has a novel design; through forming at least one groove in the substrate of the optical modulation structure according to one or more embodiments of the disclosure, the cell gap of the optical modulation region is greater than the cell gap of the non-optical modulation region, and the liquid crystal cell gap in the optical modulation region may be increased, thereby increasing the range of the adjustable refractive power of the optical modulation structure provided in one or more embodiments of the disclosure. As a result, in the optical modulation structure provided in one or more embodiments of the disclosure, the liquid crystal cell gap in the optical modulation region is not expanded by increasing the height of the spacer, whereby the manufacturing difficulties of the optical modulation structure may be reduced according to one or more embodiments of the disclosure, the possibility of bending the substrate of the optical modulation structure may be lessened in one or more embodiments of the disclosure, and the issue of the abnormal liquid crystal cell gap which results from uneven distribution of the medium layer may be mitigated.

Moreover, through forming at least one groove in the substrate of the optical modulation structure provided in one or more embodiments of the disclosure, when the medium layer is disposed on the substrate, the groove has a relatively large space for accommodating the liquid crystal molecules; accordingly, the diffusion rate of the liquid crystal molecules may be slowed down, and the overflow issue of the liquid crystal molecules in the optical modulation structure may be further mitigated.

Although the embodiments of the disclosure and the advantages thereof have been disclosed above, it should be understood that any person skilled in the art can make changes, substitutions, and modifications without departing from the spirit and scope of the disclosure, and the features of the embodiments can be arbitrarily mixed and replaced to form other new embodiments. In addition, the protection scope of the disclosure is not limited to the process, machine, manufacture, material composition, device, method, and steps in the specific embodiments described in the specification. Any person skilled in the art can understand conventional or future-developed processes, machines, manufactures, material compositions, devices, methods, and steps from the content of the disclosure as long as the same can implement substantially the same functions or achieve substantially the same results in the embodiments described herein. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. An electronic device, having an optical modulation region and a non-optical modulation region and comprising:
   a first substrate;
   a first transparent electrode layer, disposed on the first substrate; and
   a second transparent electrode layer, disposed on the first transparent electrode layer and having an opening, wherein the optical modulation region overlaps the opening, the non-optical modulation region overlaps the first transparent electrode layer and the second transparent electrode layer, and a cell gap of the optical modulation region is greater than a cell gap of the non-optical modulation region,
   wherein the first substrate has a first thickness in the optical modulation region, the first substrate has a second thickness in the non-optical modulation region, and the first thickness is less than the second thickness.

2. The electronic device according to claim 1, further comprising a second substrate disposed opposite to the first substrate.

3. The electronic device according to claim 2, wherein the second substrate has a third thickness in the optical modulation region, the second substrate has a fourth thickness in the non-optical modulation region, and the third thickness is less than the fourth thickness.

4. The electronic device according to claim 3, wherein an etching process is performed on the second substrate, so that the third thickness of the second substrate in the optical modulation region is less than the fourth thickness of the second substrate in the non-optical modulation region.

5. The electronic device according to claim 2, wherein the second substrate has a third thickness in the optical modulation region, the second substrate has a fourth thickness in the non-optical modulation region, and the third thickness is equal to the fourth thickness.

6. The electronic device according to claim 2, wherein the first thickness of the first substrate in the optical modulation region is less than the third thickness of the second substrate in the optical modulation region.

7. The electronic device according to claim 2, wherein the second substrate has a step-shaped sidewall in the non-optical modulation region.

8. The electronic device according to claim 2, further comprising a third transparent electrode layer disposed on the second substrate.

9. The electronic device according to claim 1, further comprising a first support member and a second support member, wherein the first support member and the second support member are disposed in the non-optical modulation region, the first support member is closer to the optical modulation region than the second support member is, and a height of the first support member is greater than a height of the second support member.

10. The electronic device according to claim 9, further comprising an adhesion material disposed between the first support member and the second support member.

11. The electronic device according to claim 9, further comprising an adhesion material overlapping the second support member.

12. The electronic device according to claim 1, further comprising a second substrate disposed opposite to the first substrate.

13. The electronic device according to claim 12, wherein the first support member comprises a first auxiliary support member respectively disposed on the first substrate and the second substrate, and a top surface of the first auxiliary support member correspondingly disposed on the first substrate abuts against a bottom surface of the first auxiliary support member correspondingly disposed on the second substrate.

14. The electronic device according to claim 12, wherein the second support member comprises a second auxiliary support member respectively disposed on the first substrate and the second substrate, and a top surface of the second auxiliary support member correspondingly disposed on the first substrate is spaced from a bottom surface of the second auxiliary support member correspondingly disposed on the second substrate by a cell gap.

15. The electronic device according to claim 1, wherein the first substrate has a step-shaped sidewall in the non-optical modulation region.

16. The electronic device according to claim 1, wherein the first substrate has a sidewall in the non-optical modulation region, and an included angle between the sidewall and a top surface of the first substrate in the optical modulation region is greater than or equal to 30 degrees and less than 90 degrees.

17. The electronic device according to claim 1, further comprising a third support member disposed in the optical modulation region.

18. The electronic device according to claim 1, further comprising a high-resistivity film disposed on the second transparent electrode layer.

\* \* \* \* \*